United States Patent [19]

Hunter

[11] 4,265,404

[45] May 5, 1981

[54] SUPPORT STRUCTURE FOR TRAVELING SPRINKLER

[75] Inventor: Edwin J. Hunter, Rancho Santa Fe, Calif.

[73] Assignee: The Toro Company, San Marcos, Calif.

[21] Appl. No.: 105,398

[22] Filed: Dec. 19, 1979

Related U.S. Application Data

[62] Division of Ser. No. 827,787, Oct. 13, 1977, Pat. No. 4,204,642.

[51] Int. Cl.³ .............................................. A01G 25/09
[52] U.S. Cl. .................................... 239/186; 239/191
[58] Field of Search .............................. 239/97–100, 239/178, 192, 184, 186, 183, 191; 137/344

[56] References Cited

FOREIGN PATENT DOCUMENTS 924353  4/1973  Canada ...................................... 239/179
561667 10/1923  France ...................................... 239/184

Primary Examiner—Andres Kashnikow
Attorney, Agent, or Firm—Poms, Smith, Lande & Rose

[57] ABSTRACT

A low capital investment system for irrigating a relatively large area field, comprising a mobile base, and a sprinkler mounted on the base and adapted to accumulate water from a water supply and to intermittently discharge accumulated water in an irrigating stream over the field. Apparatus is provided for propelling the base in a back and forth movement traversing a field, and for generally reversing the water discharge direction each time the direction of travel is reversed. The sprinkler includes a novel, resiliently expandable reservoir construction for accumulating relatively large volume, intermittent bursts, and a drive system which also provides relatively short range, continual irrigation. Separate sprinkler units can be used on a field concurrently, or a single unit can be moved over successive areas of a field until the whole field has been covered. The system may also be combined with a center pivot device to irrigate land that would otherwise be unused.

9 Claims, 27 Drawing Figures

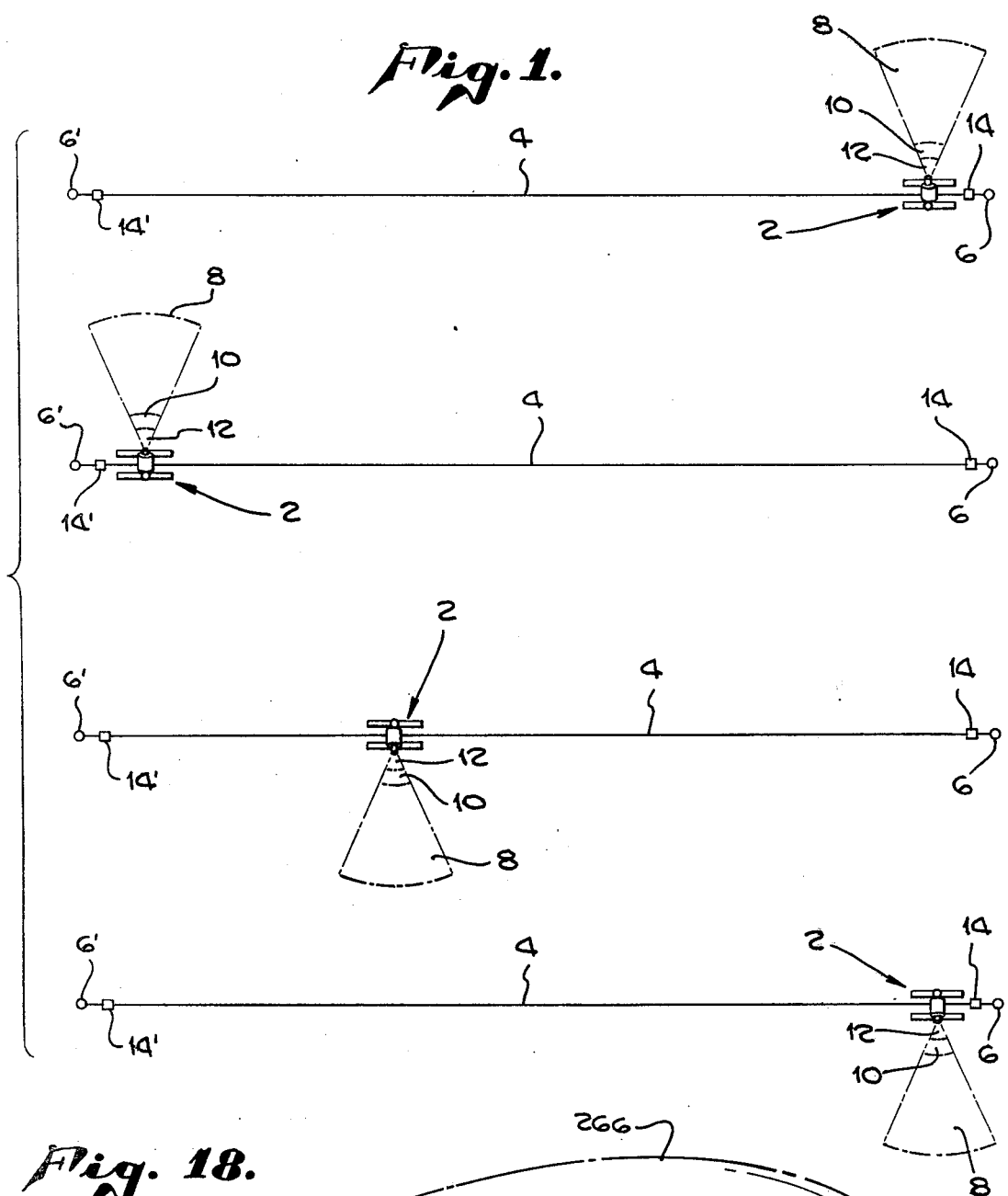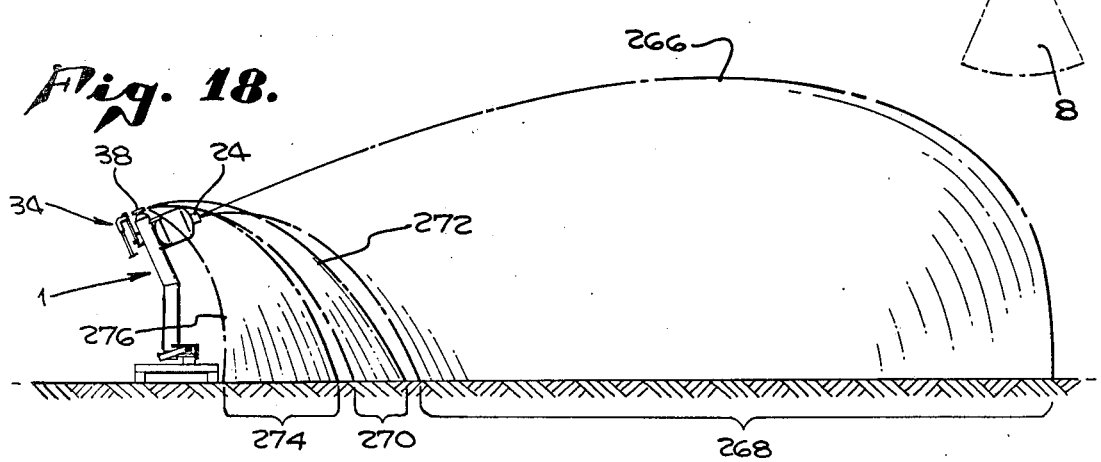

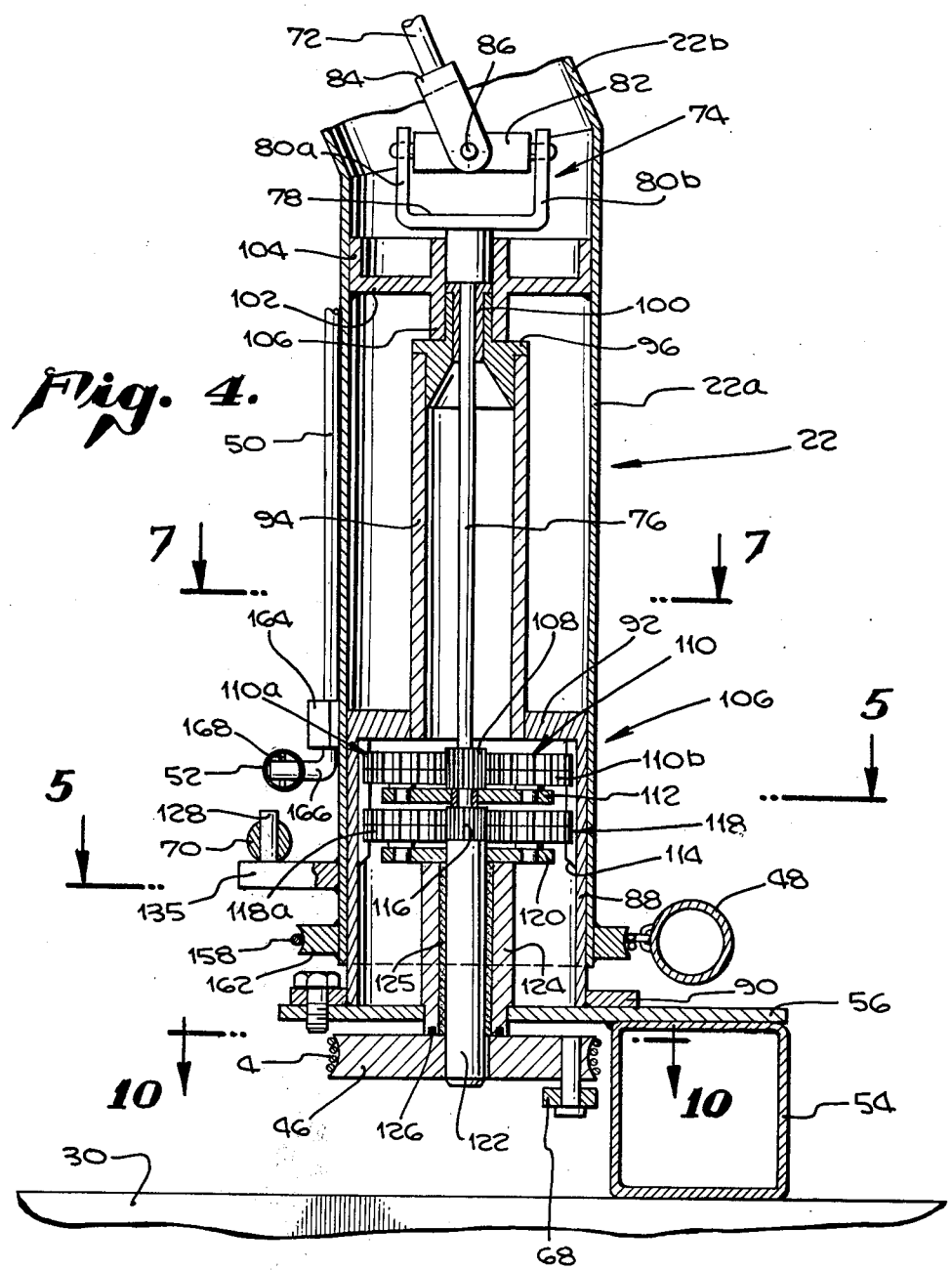

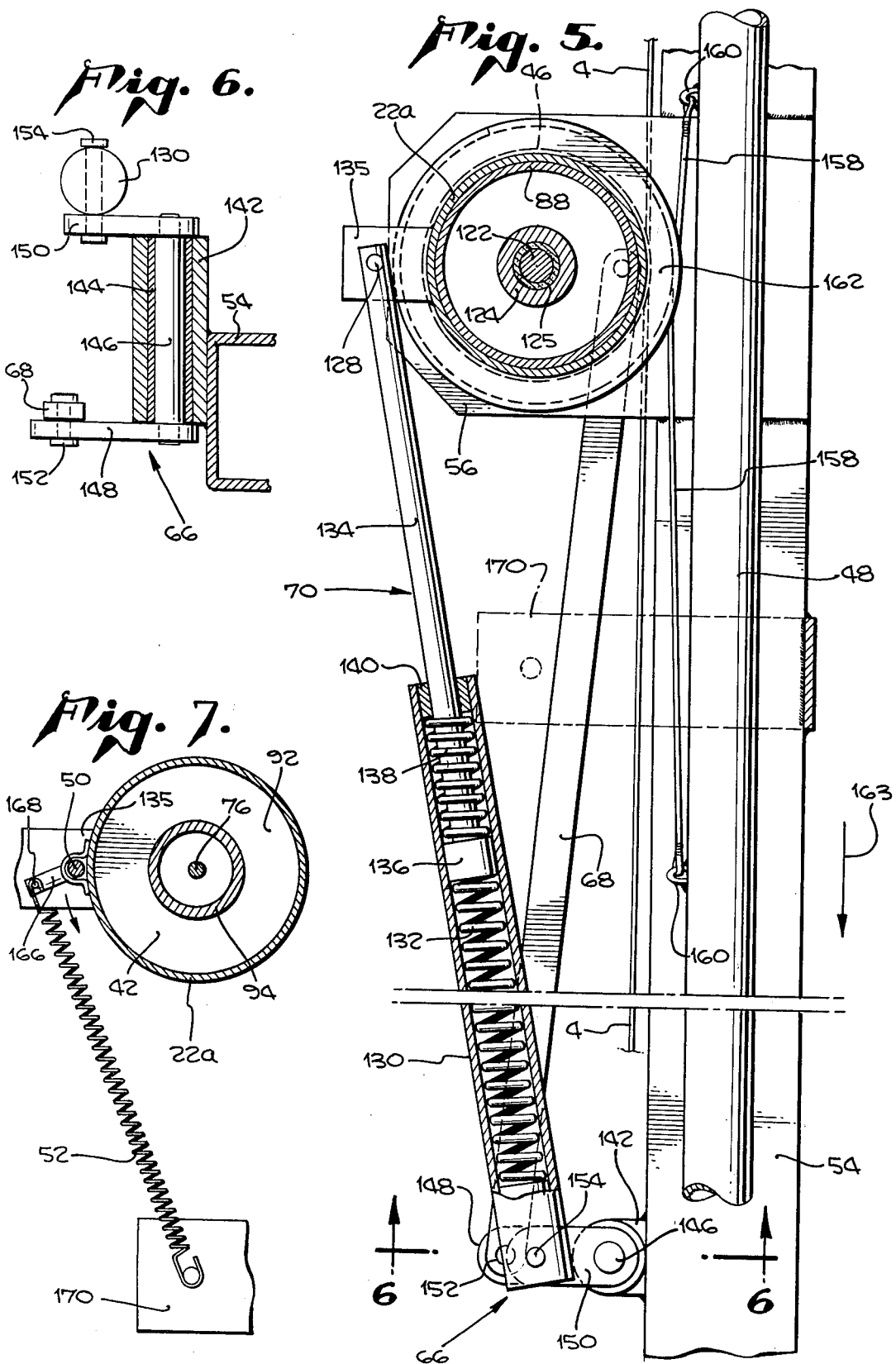

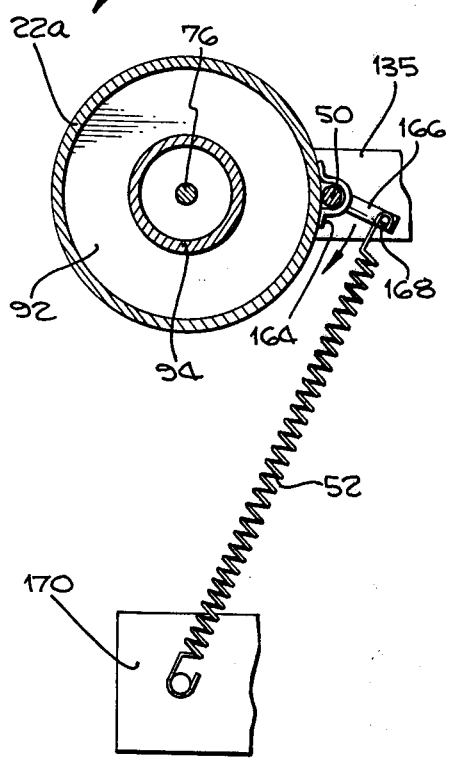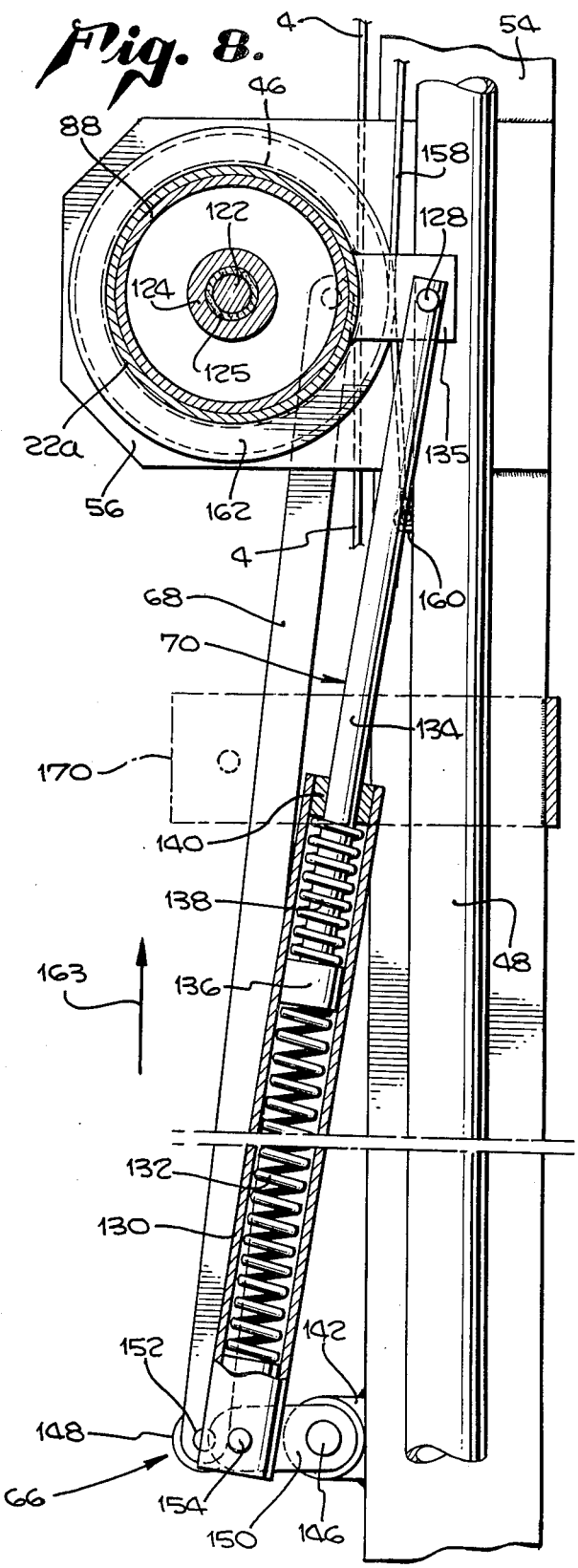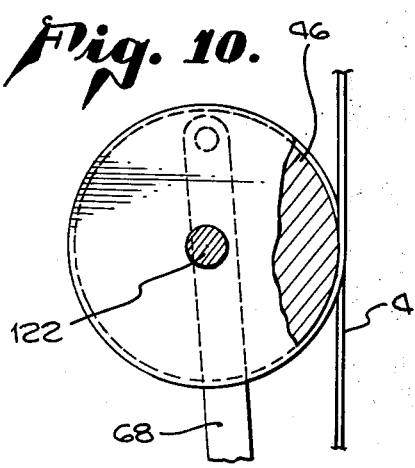

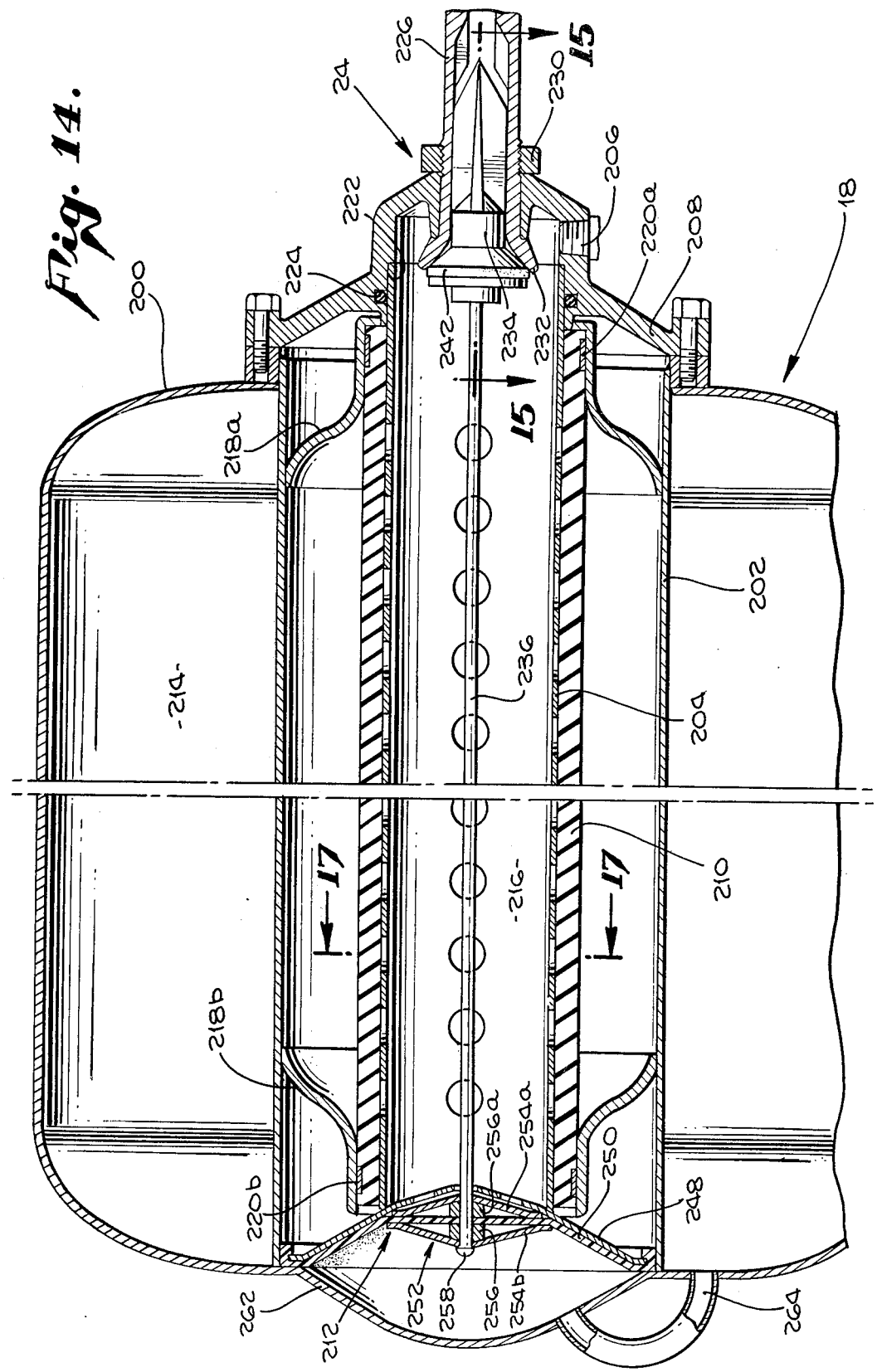

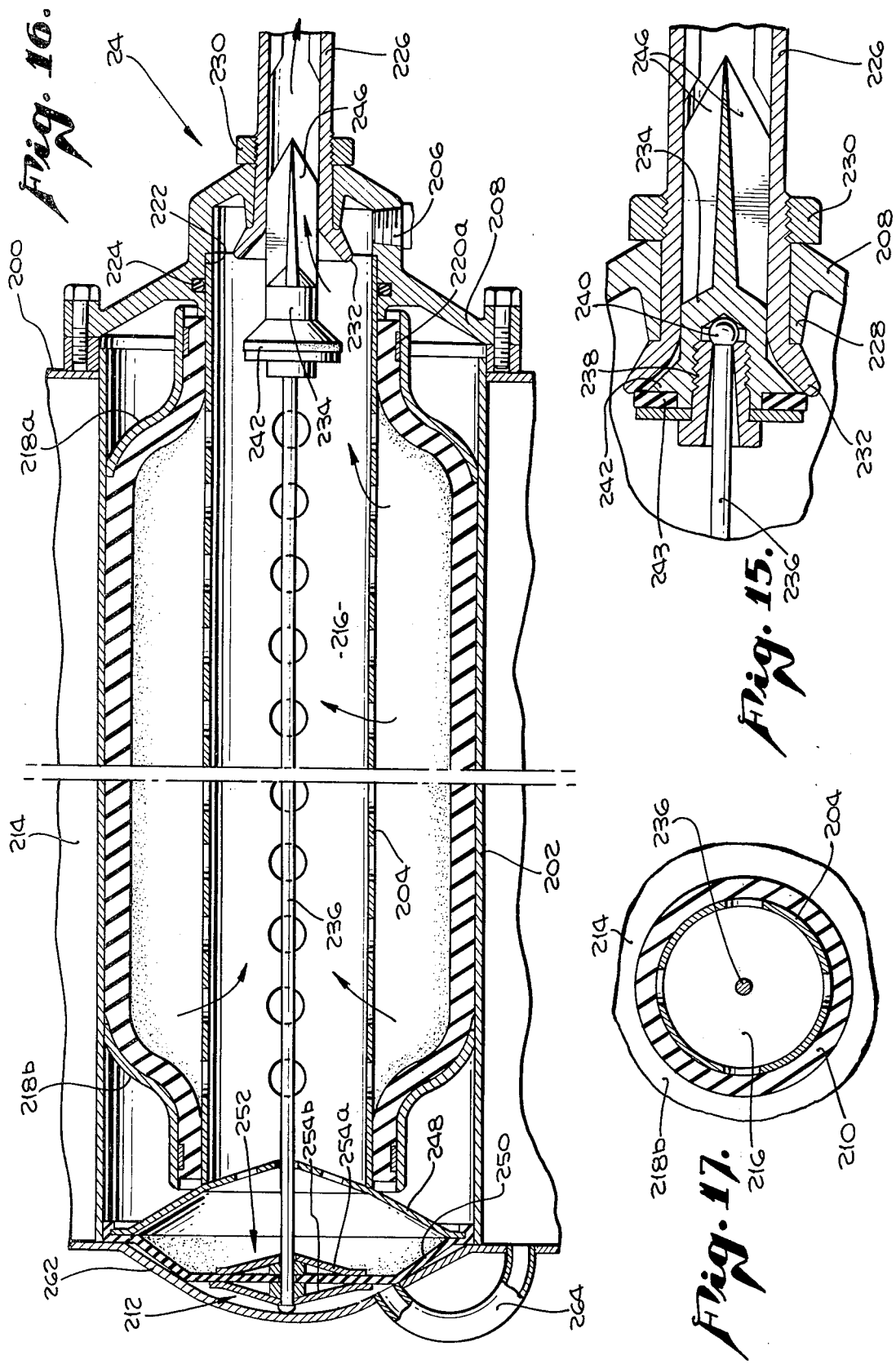

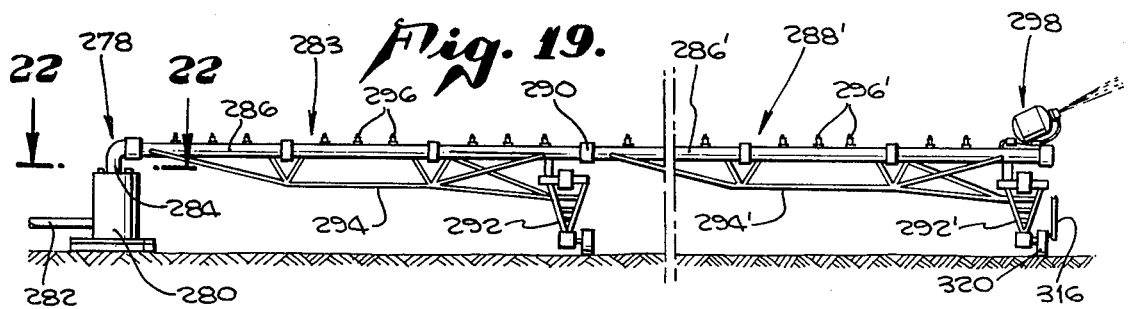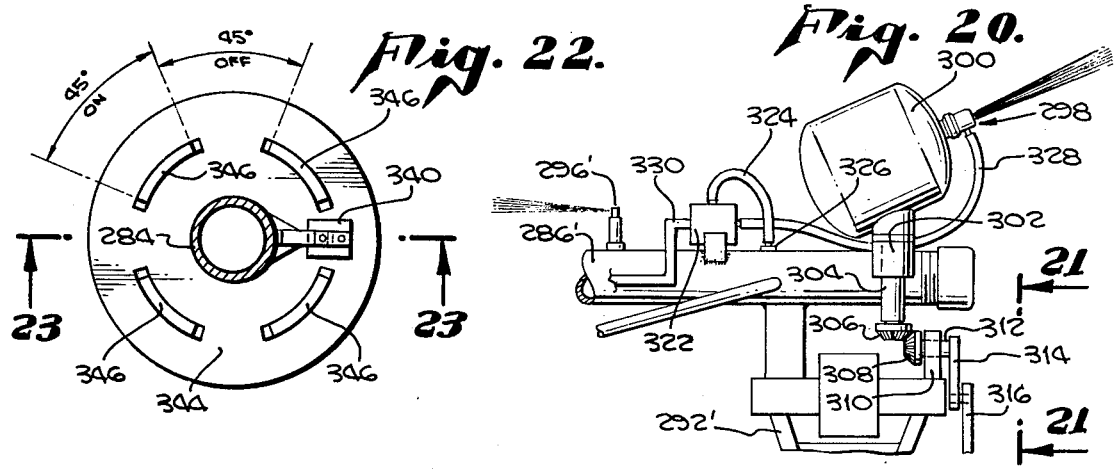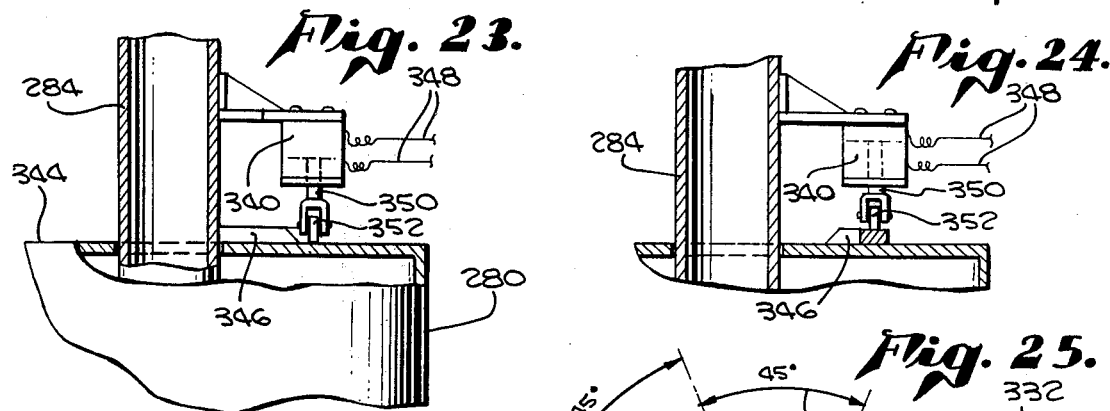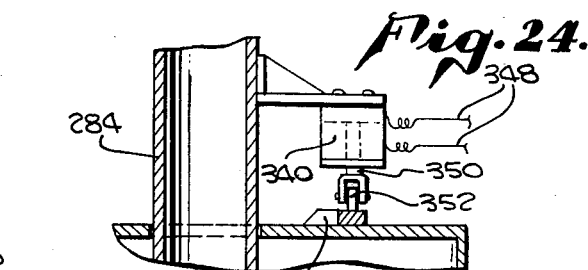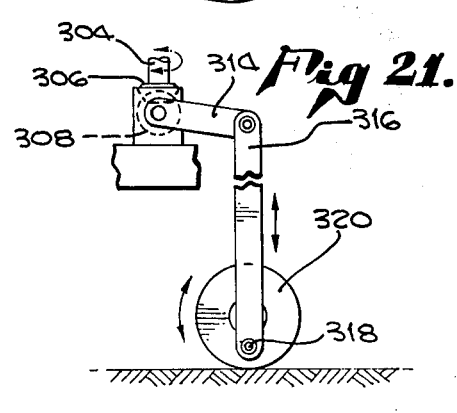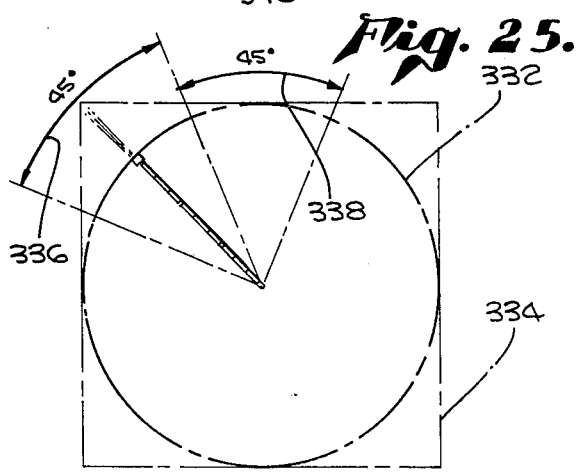

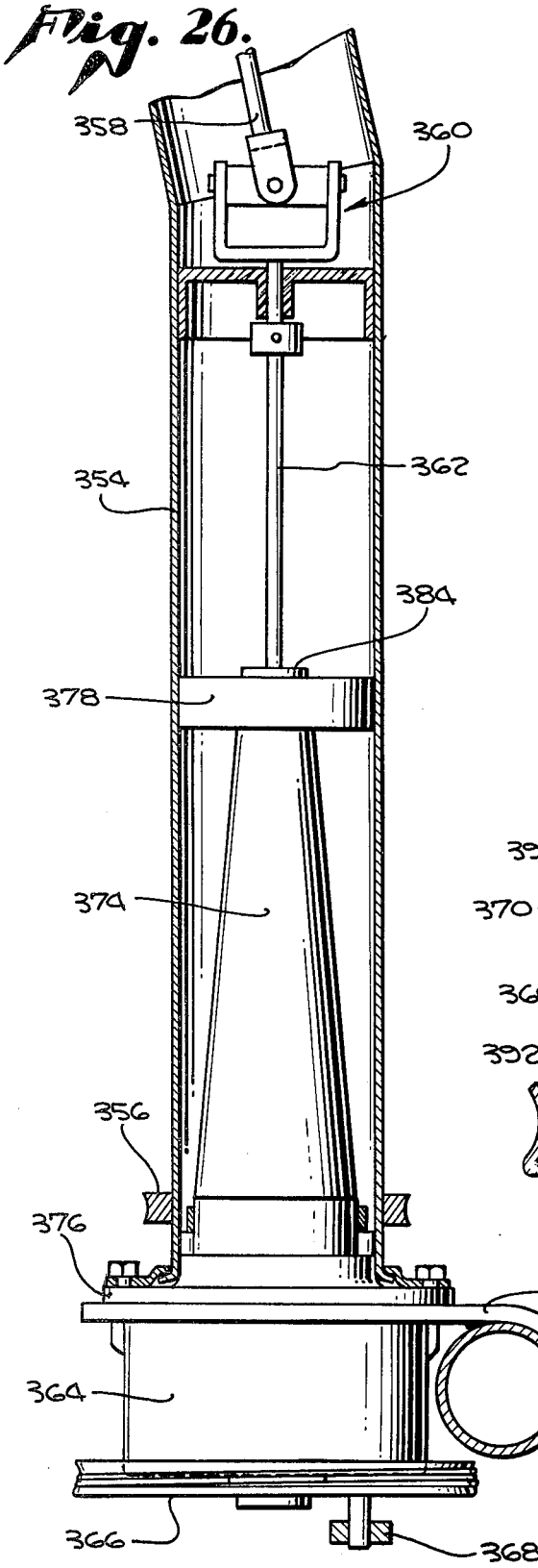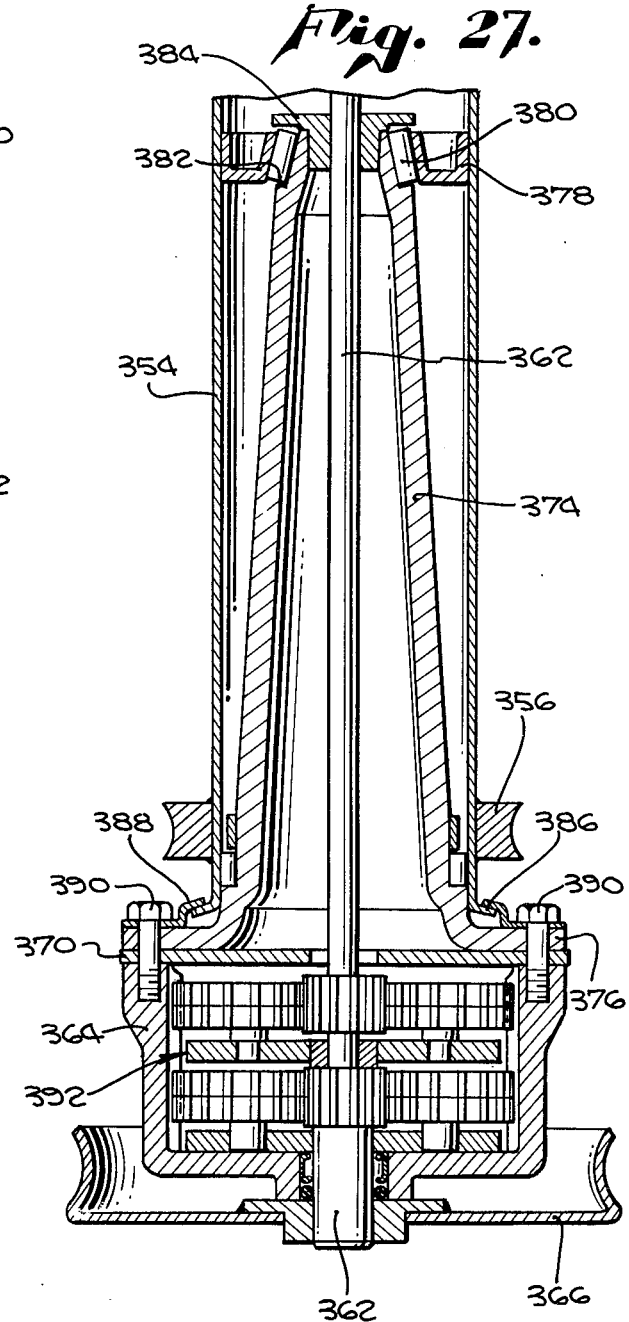

SUPPORT STRUCTURE FOR TRAVELING SPRINKLER

This is a division of application Ser. No. 827,787, filed Oct. 13, 1977, now U.S. Pat. No. 4,204,642.

BACKGROUND OF THE INVENTION

The present invention relates in general to methods and sprinkler apparatus for irrigating agricultural fields. More specifically, the present invention relates to traveling sprinklers used to water large fields under agricultural cultivation wherein the sprinkler must traverse fairly large land areas in a continuous and fully automatic manner so as to apply needed water with a minimum of attention from an operator.

A common approach to the problem of irrigating a large area heretofore has been to utilize a self-propelled irrigation system which pivots around a central source of irrigation water and irrigates a generally circular configured area. These center-pivot irrigation systems generally consist of a plurality of individual units aligned in a linear series, each individual unit being provided with propulsion means for rotating about a center pivot. An alignment control device is required to keep the individual units in a linear alignment extending radially outward from the center pivot. These center pivot systems are generally limited to use in very large agricultural fields, which are typically square and at least one-half mile on a side. As water is distributed over a generally circular area, the corners of the agricultural field are often inadequately irrigated.

In addition to the terrain limitations inherent in a center-pivot system, such systems typically require an input water flow volume of at least 500 gallons per minute in order to adequately pressurize a distribution system, which is typically at least one-quarter mile long and which continuously applies water to the field being irrigated. With large quantities of water continually dispensed from the system, water is generally discharged onto the field as fast as it is received in order to avoid unnecessary accumulations which might weigh the system down. In U.S. Pat. No. 3,610,531 to Erickson, for example, linear traveling sprinkler apparatus is shown in which the sprinklers are operated while the system is stopped, energy from the flowing water is stored in a spring, and the stored energy is used to move the sprinkler line only when it is substantially empty.

Also, most center pivot systems are limited in application to use in areas where the nature of the soil permits a high rate of penetration of the irrigation water beneath the surface. This is necessitated by the continuous application of large volumes of water by the system. Additionally, the soil must have high load bearing properties when it is wet in order to support the drive wheels of the irrigation units and provide traction therefor.

Other types of traveling sprinklers have been known heretofore, such as in the prior U.S. Pat. No. 1,142,448, which traverse a strip configured portion of a field. This type of sprinkler travels along a cable, sprinkling continuously across the field as it is propelled by means of a cable wind-up reel. They are not designed for large area coverage such as a farm field or golf course, and are generally incapable of providing a relatively low irrigation rate to the area they do cover.

Another approach to solving the problem of irrigating a large area involves the use of an in-ground system in which sprinkler heads are distributed over the field and supplied with water by an underground conduit network. While such systems have been provided with intermittent type sprinklers to reduce the rate at which water is applied, the initial capital and installation costs are high and, unless relatively large amounts of water are required on a fairly regular basis, may be prohibitive.

Certain irrigation applications require a more flexible solution than available heretofore; one which is easily adaptable to smaller, irregularly shaped fields and is less expensive and less complex than the systems used in the large fields. More importantly, there exists a need for a relatively low cost, auxiliary or supplemental type irrigation system for use in localities which generally have adequate rain fall, but which are subject to unusually dry periods when temporary irrigation is required. In such localities the high costs of heretofore available large area systems may have inhibited the installation of any system at all.

In addition, there are irrigation needs where the type of soil under irrigation will not accept the amount of water which may otherwise be required to operate the srinkler system. There is accordingly a need for a sprinkler irrigation system adaptable for use in areas where the soil does not allow rapid penetration of water, or is structurally unable to support and provide traction for the drive wheels of the system.

SUMMARY OF THE INVENTION

In view of the above problems associated with the prior art, an object of the present invention is the provision of a novel and improved low cost agricultural sprinkler system and method for use in localities which generally have an adequate rain fall and do not, under normal conditions, require artificial irrigation.

Another object is the provision of a novel and improved srinkler system capable of providing a relatively low irrigation rate over a large area, for use in agricultural irrigation where the nature of the soil does not permit a high rate of penetration of the irrigation water beneath the surface.

Another object of the present invention is the provision of an improved traveling agricultural sprinkler which is relatively inexpensive to own and operate and which is suitable for use in both small and large agricultural fields having irregular configurations.

A further object of the present invention is the provision of an improvement in means for automatically propelling an agricultural sprinkler back and forth across a strip configured area of a field with a minimum of operator attention in a reliable manner.

Yet another object is the provision of a center-pivot irrigation system with a relatively low cost, supplemental intermittent sprinkler means adapted to substantially increase the area irrigated by said system.

The above objects are satisfied in the present invention by the provision a sprinkler system comprising a mobile base, a water supply sprinkler means mounted on the base for accumulating water from the supply and intermittently discharging a stream of accumulated water, and means for propelling the base across a field to be irrigated, and the method of operating the system. The base is propelled in a
back and forth movement and water is discharged generally laterally to the direction of travel, such that a strip of the field is irrigated on each run.

In a preferred embodiment the sprinkler means comprises an accumulator housing with a resiliently expandable bladder which forms a reservoir to receive and accumulate water from the water supply. The bladder expands generally laterally to the discharge direction against an expansion limiting casing as water is accumulated. When a threshold water pressure is reached a pressure responsive diaphragm, which forms part of the reservoir wall, flexes to expose an outlet nozzle through which the accumulated water is discharged under pressure. Contraction of the bladder prolongs the discharge until a second threshold is reached, at which time the diaphragm flexes back to close the nozzle and the bladder rests against a perforated structural substrate.

In one embodiment the sprinkler is propelled along a guide wire extending across the field by means of a drive pulley rotatably mounted on the base and encircled by the guide wire, and means for rotatably driving the pulley so that it pulls the base along the wire. The pulley is also used to oscillate the sprinkler as it travels over the field. In another embodiment, a linearly rigid guide rod is extended across the field, and the sprinkler propelled by means of a pair of pinch wheels adjacently mounted on the base and pinching the guide rod therebetween. In either case the drive force is preferably derived from a water wheel, and means are provided for diverting a portion of the water supply and directing it in a jet to rotate the wheel. Water from the jet apparatus is also directed onto the field at a short range relative to the intermittent stream, thereby providing close in irrigation.

Other features include the provision of a shift rod means, which engages a stop positioned on the field as the sprinkler approaches the stop, to reverse both the direction of sprinkler travel and the direction in which water is discharged from the sprinkler.

In another application of the invention, a rotating center-pivot irrigation system is supplemented with a sprinkler means which intermittently discharges an irrigating stream generally outwardly from the center-pivot. With the addition of an appropriate timing control, the area under irrigation may be changed from a circular to a larger area, generally square configuration, thereby substantially reducing the amount of unused land when adjacent fields are irrigated.

A more complete understanding of the present invention, as well as a recognition of additional object and advantages, may be obtained by those skilled in the art from a consideration of the following detailed description of exemplary embodiments thereof. Reference will be made to the appended sheets of drawings, which will first be briefly described.

DESCRIPTION OF THE DRAWINGS

FIG. 1 is a plan view illustrating an agricultural field being irrigated by four mobile sprinklers in accordance with the invention;

FIG. 4 is a sectional view, through the plane 4—4 of FIG. 3, showing details of the base drive system;

FIG. 5 is a sectional view, through the plane 5—5 of FIG. 4, showing a mechanism for reversing the direction of sprinkling when the sprinkler has reached the end of a field, and for oscillating the sprinkler during a traversal;

FIG. 6 is a partially cross-sectional view, through the plane 6—6 of FIG. 5, of a bell crank employed in the sprinkler oscillating structure;

FIG. 7 is a partially cross-sectional view, through the plane of 7—7 of FIG. 4, of part of the structure employed in reversing the direction of sprinkling;

FIGS. 8 and 9 are partially cross-sectional views similar to FIGS. 5 and 7, respectively, showing the sprinkler directional and oscillating mechanisms in a second position;

FIG. 10 is a partially cut-away view, through the plane 10—10 of FIG. 4, showing a pulley employed in the drive mechanism;

FIG. 11 is a cross-sectional view showing the actuating mechanism for the sprinkler drive system;

FIG. 12 is an elevation view, through the plane 12—12 of FIG. 11 showing portions of the control apparatus used in reversing the direction of sprinkler travel;

FIG. 13 is a plan view, through the plane 13—13 of FIG. 11, showing alternate positions of water drive apparatus which also provides near and intermediate distance constant sprinkling;

FIG. 14 is a sectional view, through the plane 14—14 of FIG. 2, of apparatus constructed in accordance with the invention for emitting an intermittent long distance spray;

FIG. 15 is a sectional view, through the plane 15—15 of FIG. 14, of the nozzle portion of the spraying apparatus shown in FIG. 14;

FIG. 16 is a sectional view similar to FIG. 14, showing the intermittent sprinkling apparatus at a second stage of the sprinkling cycle;

FIG. 17 is a sectional view, through the plane 17—17 of FIG. 14, of the expandable water containment apparatus employed in the intermittent sprinkler;

FIG. 18 is an elevation view illustrating the spray pattern achieved with the embodiment of FIGS. 1-17;

FIG. 19 is an elevation view of another embodiment of the invention in which a rotary irrigation system is supplemented by an intermittent sprinkler;

FIG. 20 is a more detailed elevation view of the intermittent sprinkler shown in FIG. 19, and of its engagement with the remainder or the irrigation system;

FIG. 21 is an elevation view, through the plane 21—21 of FIG. 20, showing means for actuating an oscillating mechanism for the intermittent sprinkler;

FIG. 22 is a plan view, through the plane 22—22 of FIG. 19, of electrical control apparatus associated with the intermittent sprinkler of FIG. 19;

FIG. 23 is a sectional view, through the plane 23—23 of FIG. 22, showing the control apparatus at a first position in the sprinkling cycle;

FIG. 24 is a sectional view similar to FIG. 23 showing the control apparatus at a second state of the sprinkling cycle;

FIG. 25 is a plan view of a field showing an irrigation pattern achievable with the system of FIG. 19;

FIG. 26 is a partially sectional view showing the general layout of the drive mechanism for another embodiment of a self-propelled intermittent sprinkler;

FIG. 27 is a sectional view showing portions of the drive mechanism of FIG. 26 in greater detail;

DETAILED DESCRIPTION OF PREFERRED EMBODIMENTS

Figure 2:
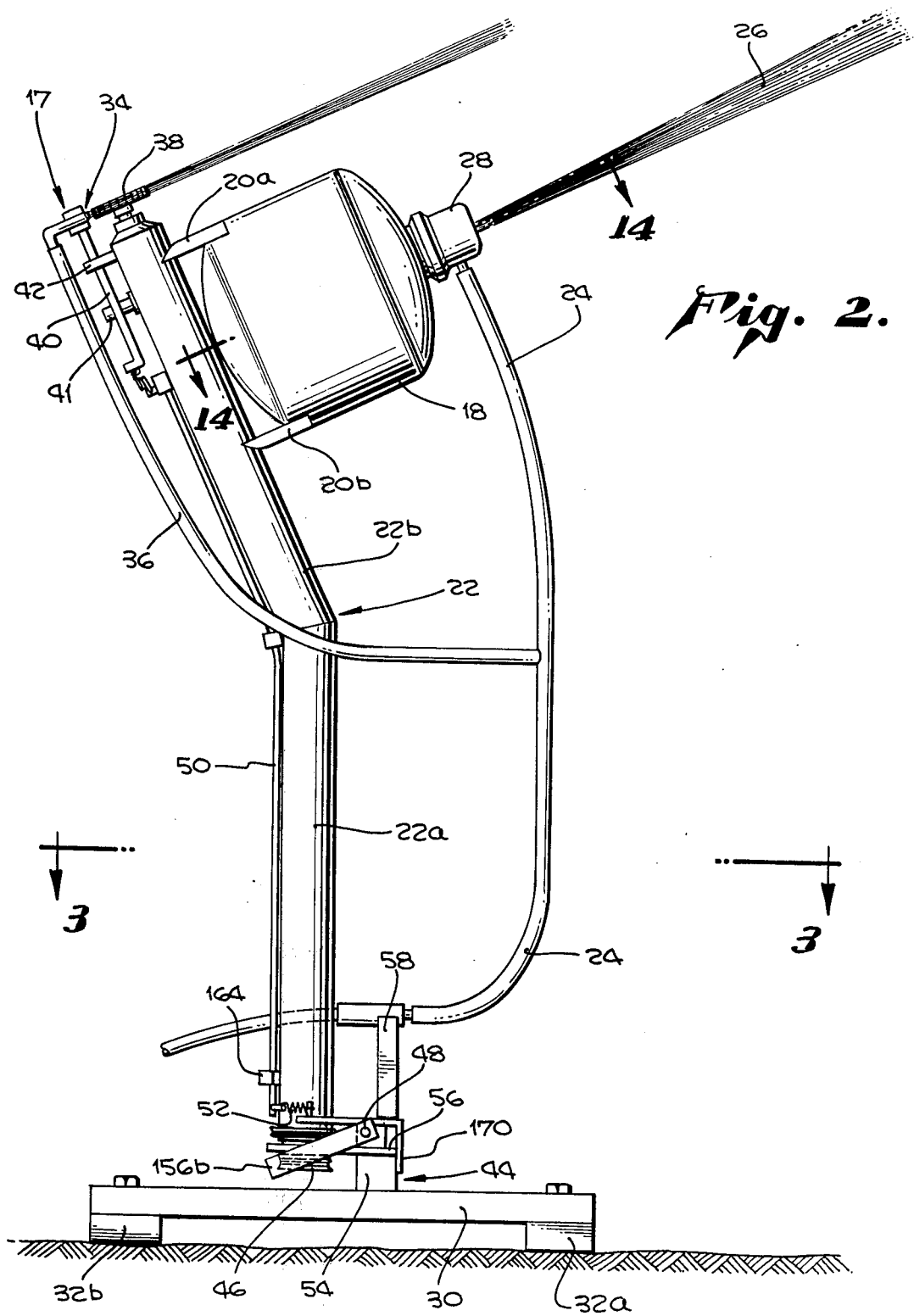
FIG. 2 is a side elevation view of a mobile agricultural sprinkler constructed in accordance with the invention, showing long distance intermittent spraying structure, a mobile base for supporting and transporting said structure, and a drive system for propelling the base.

An agricultural sprinkler system incorporating the present invention is shown in FIG. 1. A plurality of individual agricultural sprinklers 2, are shown, each being adapted to traverse a field and to irrigate a strip configured area thereof. The term "field" is used herein in a general sense, and includes crop fields, pasturage, large open areas such as golf courses and parks, and the like. The term "agricultural" is used in an equally broad sense. Each sprinkler is propelled along a guide wire 4 which extends across a portion of the field between guide wire anchors 6 and $6^1$. While the figure shows four separate sprinklers covering an entire field, their mobile capability would also permit irrigation with but a single sprinkler which is moved sequentially from one guide wire to the next after irrigating the portion of the field associated with each wire. This flexibility enables a trade-off to be achieved between capital cost and the time required to irrigate a field, the cost decreasing but the required time increasing as the total number of sprinklers is reduced.

Details of the spray pattern achieved with the exemplary embodiment depicted are provided hereinafter, but it should be noted at this point that in the preferred embodiment three zones of spraying are achieved. A first, long distance zone 8 is irrigated with an intermittent spraying pattern in which relatively high volume bursts of water are delivered at time-spaced intervals, such that a large area coverage is achieved with a relatively low amount of water expended per unit of area. An intermediate zone 10 is irrigated with a continual stream of water which is emitted from the sprinkler at a considerably lesser volumetric rate than the intermittent bursts. However, because its area is less than that of the long distance zone and the spraying is continual, the amount of water delivered to the intermediate zone per unit area may be similar to that for the long distance zone. A short distance zone 12 is also irrigated by a continual stream of water which is emitted from a sprinkler at the same volumetric rate as for the intermediate zone, but which is deflected to cover the zone closest to the sprinkler. In practice there is considerable overlap between the three irrigation zones, but the bulk of the water delivered falls into the pattern described above.

The traveling sprinklers traverse the field along their associated guide wires between opposed stop posts 14, $14^1$, and are shown at four different points of the sprinkling cycle. Appropriate flexible water conduits, not shown in FIG. 1, are provided to supply each sprinkler with irrigation water. The topmost sprinkler is shown at the beginning of a right-to-left traverse, spraying to the right with respect to its direction of travel. In the preferred mode of operation it continues moving until it reaches the position of the second sprinkler, which is shown at the opposite end of the field, having just contacted its respective stop $14^1$. At this point water is still spraying in the same direction as during the preceding traversal of the field. The next sprinkler is at a later stage in the sprinkling cycle, having reversed both its direction of travel and its direction of sprinkling as a result of engaging its stop $14^1$. The bottom sprinkler is depicted at the end of a return traverse at the first contact stop 14, and is still sprinkling in the same direction as during the preceding left-to-right traverse. Further movement of this sprinkler into its associated right hand stop 14 reverses both its direction of travel and its direction of sprinkling, causing it to assume the state of the top sprinkler.

By traversing back and forth across the field and sprinkling in first one direction and then the opposite direction in so doing, each sprinkler irrigates a large area with a roughly uniform amount of water, while keeping the capital equipment requirements low. The area coverage is enhanced by the intermittent sprinkling device, which enables the achievement of long distance irrigation over a wide area without using more water than is necessary or desired.

Referring now to FIG. 2, the principal operating sections of a sprinkler constructed in accordance with the present invention are shown. The general features of the sprinkler apparatus will be discussed in connection with FIG. 2, with the details of the various components disclosed in subsequent figures. A water accumulator tank or housing 18 is mounted via welded brackets 20a and 20b to a tubular support pedestal generally indicated by reference numeral 22, the lower portion 22a of which is vertically disposed and the upper portion 22b of which is tilted at an angle such that the weight of the water in housing 18 is generally centered over lower portion 22a. Irrigating water is supplied through a conduit 24 to tank 18, which accumulates the water and intermittently emits a long distance stream or spray 26 through nozzle 28.

The support pedestal and accumulator tank are mounted on a base 30, which includes a pair of ground contacting runners 32a and 32b. The runners are preferably provided with forward and rear tip portions having generally upward sloping lower surfaces which allow them to traverse uneven terrain with a minimum amount of resistance.

A combined actuator for providing both a driving force to propel the sprinkler, and intermediate/short distance irrigation is provided at the top of pedestal 22. A jet forming orifice means 34 is supplied with pressurized water by a branch 36 of conduit 24. Orifice means 34 includes a pair of spaced orifices, both of which emit continual jets of water. A water turbine wheel 38, otherwise known as a Pelton wheel, is rotatably mounted at the top of upper support pedestal portion 22b in the path of one or the other of the jets emitted by orifice means 34. The orientation of the jet orifices is controlled by a partially rotatable support rod 40, pivotally mounted to the pedestal by a pivot pin 41 and rotationally constrained between a pair of spaced stops 42 on the pedestal.

Mounting and position control apparatus for pedestal 22 is carried on base 30 and generally indicated by reference numeral 44. This apparatus includes as its principle components a drive pulley 46 carried below pedestal 22 and coupled internally through the pedestal with turbine wheel 38 to propel the sprinkler across a field, a shift rod 48 which engages one of the rod stops 14 at each end of the field to reverse the direction of sprinkling, and means for reversing the direction of sprinkler travel. The last mentioned means includes a control rod 50 which is rotatably supported adjacent pedestal 22 and, together with a spring 52, couples jet support rod 40 with the base mounting mechanism. A structural beam 54 of generally square cross-section is mounted on the upper side of base 30, with a support plate 56 which actually carries the mounting for pedestal 22 rigidly attached to the beam. A conduit carrying member 58 also extends upwardly from plate 56 to support water supply conduit 26.

Figure 3:
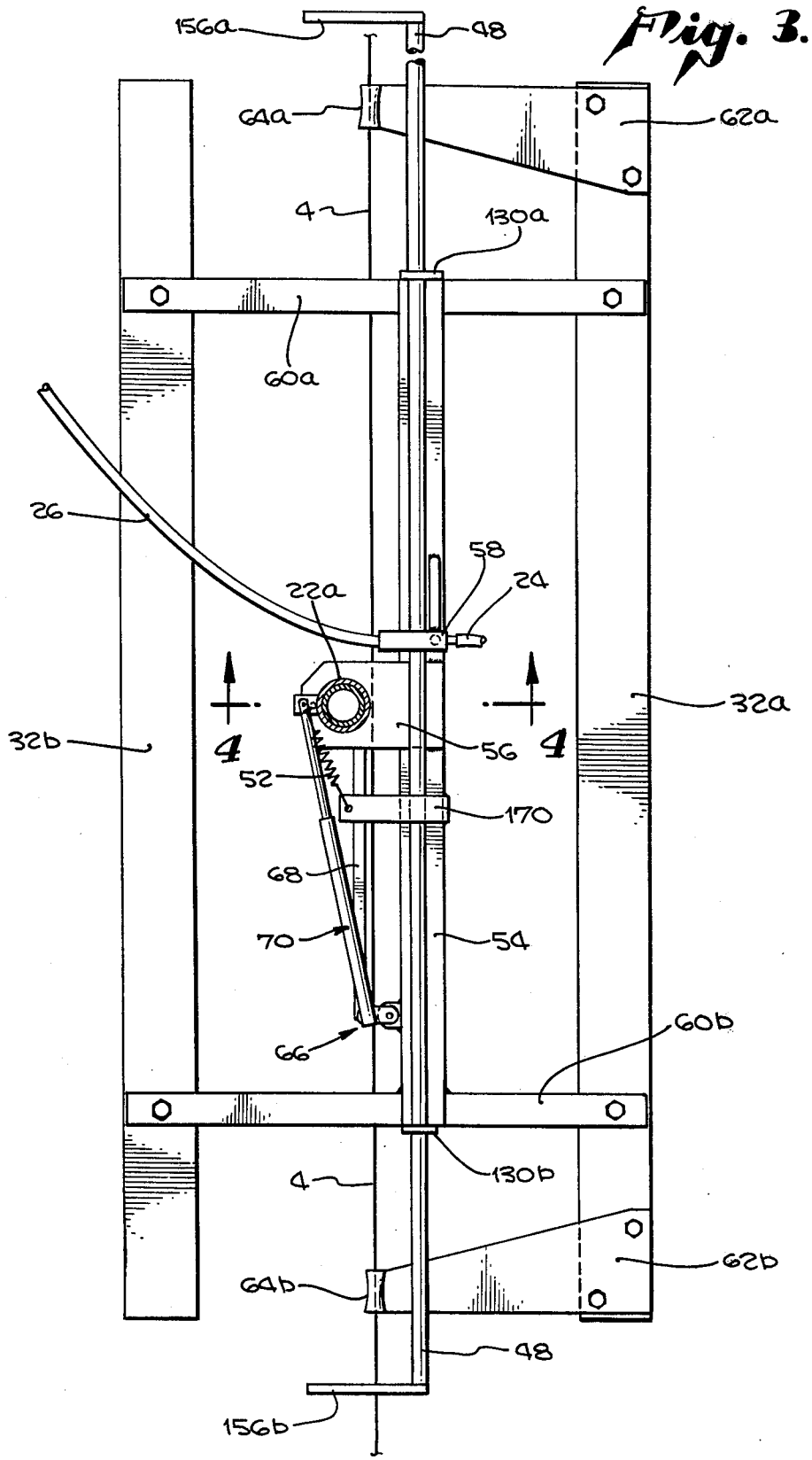
FIG. 3 is a plan view, through the plane 3—3 of FIG. 2, of a sled-like base for the sprinkler.

Referring now to FIG. 3, further details of the base are seen. Span members 60a and 60b are bolted between runners 32a and 32b to retain the runners in a generally parallel spaced relationship, and to provide support for beam 54. A pair of cantilever brackets 62a and 62b are bolted to the opposite ends of runner 32a and extend inwardly parallel to the base plane, terminating near the center of the base with generally cylindrical eyes 64a and 64b through which guide wire 4 extends. Upstanding, apertured mounting members 130a and 130b are carried respectively on span members 60a and 60b, with shift rod 48 captured within the apertures and limited thereby to an axial translation movement. The base structure further includes means for oscillating the sprinkler as the field is traversed, said means comprising a bell crank 66 affixed to beam 54, a first link 68 connected between one end of the bellcrank and the underside of drive pulley 46, and a spring biased telescoping link 70 connected between the other end of the bell crank and sprinkler support pedestal 22.

A more detailed view of the sprinkler drive mechanism is provided in FIG. 4. In this figure it is seen that support pedestal 22 comprises a hollow tube which houses major portions of the drive apparatus. An upper drive shaft 72 is coupled by a gear mechanism to water turbine wheel 38 at its upper end, and is rotated about its axis in response to rotation of the water wheel. Shaft 72 is connected through a universal joint, generally indicated by reference numeral 74, to a lower drive rod 76 which imparts a rotary drive motion to drive pulley 46 through a transmission system at its lower end. Universal joint 74 comprises a yoke 78 having a pair of upstanding arms 80a and 80b, each of which is slotted and retains a respective end of a crossbar 82 within its slot. Upper drive shaft 72 terminates in a forked clip 84 which is coupled to the center of crossbar 82 by a pivot connection 86 such that axial rotation of upper drive shaft 72 is translated through universal joint 74 to a similar axial rotation of lower drive shaft 76.

Support pedestal 22 is carried on mounting plate 56 by means of an inner housing 88, which extends upwardly from plate 56 and is secured thereto by welding, and an annular flange 90 which is bolted to plate 56. The outer diameter of housing 88 is slightly less than the inner diameter of pedestal 22, permitting the pedestal to be positioned co-axially over the housing and rotated axially with respect to the housing. At its upper end, approximately one-third of the height of lower pedestal portion 22a, housing 88 is covered by an annularly inward converging roof plate 92, which in turn supports a hollow tubular structural member 94 extending upwardly toward universal joint 74. A low friction bearing member 96 for lower drive shaft 76 is carried at the upper end of structural member 94, the drive shaft being provided with a hear 98 which sits over and is rotatable with respect to a cap 100 inserted into bearing member 96. Pedestal support is provided by means of a rigid rotor member 102 which has a rim 104 welded to the inner wall of the pedestal, and a hub 106 which rests on bearing member 96 and rotates thereabout.

Drive pulley 46 is encircled several times by a guide wire 4 to insure good traction and eliminate slippage between the two components. The sprinkler apparatus is propelled across the ground by rotating pulley 46 about its axis, and thereby causing the pulley to wind up on guide wire 4 in one direction and to play out an equal amount of guide wire in the opposite direction. The rim of pulley 46 is preferably coarse in texture to enhance traction, or the guide wire may be provided in an alternate form such as a link chain which engages corresponding sprockets on the periphery of the pulley.

Pulley 46 is coupled by means of a transmission 106, housed within casing 88, or rotation by lower drive shaft 76. In the exemplary embodiment shown, transmission means 106 includes a two stage planetary gear reduction means for driving pulley 46 at a speed reduced from the speed of drive shaft 76, preferably by a 36:1 ratio. Exemplary of planetary gear transmissions adaptable to the present invention is the disclosure of co-pending application, Ser. No. 694,904 "Power Transmission for Self-Propelled Irrigation System", filed June 10, 1976, now U.S. Pat. No. 4,133,344 and assigned to the assignee of the present invention.

A two-stage gear reduction system is employed, with drive shaft 76 connected at its lower end to an input drive gear 108 which intermeshes with three planet gears, of which gears 110a and 110b are shown in FIG. 4. The planet gears are mounted on a first planetary carrier 112, and intermesh with an internally geared surface 114 of casing 88 so as to rotate about the pedestal axis when input drive gear 108 rotates. In thus rotating, the planet gears 110 precess about internal gear surface 114 and in so doing rotate planet carrier 112. A sun gear 116 depends from first planet carrier 112 and rotates therewith to drive a second set of three planet gears, of which gears 118a and 118b are shown in FIG. 4. A second planet carrier 120 is driven by planet gears 118 in the same manner as first planet carrier 112 is driven by first planet gears 110. Depending axially from the underside of second planet carrier 120 is a transmission output drive shaft 122 which is secured at its lower end to rotationally drive pulley 46. A guide collar 124 extends upwardly from mounting plate 56 annularly adjacent a packing 125 for output drive shaft 122 to prevent excessive oscillations of the drive shaft. An O-ring 126 is lodged in a recess of the lower inner end of collar 124 to provide a low friction seal for the transmission lubricants.

As may be seen, planet gears 110 and 118 each comprise a pair of gear segments. The use of segmented planet gears increases the efficiency and reliability of the planetary gear assembly as the load on the assembly increases. Through the double system of planetary gears, the high speed of input drive gear 108 is reduced by a sequential transmission through the series of planetary gear assemblies to a low speed, high torque drive at transmission output shaft 122, and thereby at drive pulley 46.

The sprinkler support pedestal is continually rotated in an oscillatory motion during transit over a field by means of link 68, which is pivotally attached at one end to an off-center portion of drive pulley 46 by a first rivet and by spring biased link 70, which is pivotally attached at one end to the periphery of pedestal 22. Further details of the oscillating mechanism are shown in FIGS. 5, 6 and 10. Link 68 is a solid rod, while spring biased link 70 comprises a hollow cylinder 130 pivotally connected at one end to bell crank 66, a coil spring 132 housed within the cylinder, a connector rod 134 pivotally attached to a tab 135 on the periphery of pedestal 22 and extending into cylinder 130 at its other end, a head 136 affixed to the end of connector rod 134 within the cylinder adjacent spring 132, and a second coil spring 138 surrounding connector rod 134 and lodged within the cylinder between head 136 and a cylinder bushing cap 140. Bell crank 66, shown in FIG. 6, comprises an outer mounting block 142 welded to the side of beam 54, a low friction cylindrical bearing 144 disposed in a vertical bore in the mounting block, and a pin 146 extending through bearing 144 with arms 148 and 150 rigidly attached to its opposite ends adjacent the periphery of mounting block 142. Link 68 and cylinder 130 are pivotally attached to arms 148 and 150 by rivets 152 and 154, respectively. In operation, a rotation of drive pulley 46 to propel the sprinkler is transmitted by link 68 to an oscillatory movement of bell crank 66 about pin 146. This movement in turn is transmitted via link 70 to support pedestal 22, causing that member to oscillate back and forth through a limited rotational path so that the sprinkler sprays over an arc of approximately 30° as it traverses the field, enhancing the dispersion of water over the field.

Referring again to FIG. 3 in conjunction with FIGS. 4 and 5, means are shown for reversing the direction of sprinkling when the sprinkler has completed traversing a field in one direction and is about to return in the opposite direction. Shift rod 48 is provided with tranverse contact arms 156a and 156b at its opposite ends, which arms normally rest upon guide wire 4 and are positioned to contact one of the rod stops 14 as the sprinkler approaches the stop at the end of a traverse. A wire 158 is attached to shift rod 48 at space locations by fasteners 160, and encircles a pulley 162 welded to the lower outer periphery of sprinkler support pedestal 22. Near the end of a traverse one of the shift rod contact arms 156 will hit a rod stop 14, holding the shift rod stationary as the sprinkler continues to move towards the stop. The relative motion thus produced between the shift rod and the remainder of the sprinkler apparatus causes wire 158 to rotate pulley 162 and thus pedestal 22. The dimensions of shift rod 48 and the spacing between wire fasteners 160 are selected such that sprinkler support pedestal 22 is shifted substantially by 180°.

FIG. 8 illustrates the position of the various oscillating and sprinkler rotation elements, with pedestal 22 rotated 180° from the position shown in FIG. 5. In this position the sprinkler is ready to traverse a field in the direction indicated by arrow 163. In rotating from the position of FIG. 5 to that of FIG. 8, pedestal 22 has moved in a counterclockwise direction. During the first half of this movement rod 134 moves against spring 132 further into cylinder 130, and then returns to near its original position with respect to the cylinder as the pedestal continues rotating to the position shown in FIG. 8.

Apparatus for rotating control rod 50, and thereby reversing the direction of sprinkler travel, is shown in FIGS. 2-4 and 7. The lower end of the control rod 50 is held adjacent pedestal 22 by a U-shaped bracket 164. The rod terminates in an outwardly bent finger 166, through which a pin 168 secured to spring 52 extends. The other end of the spring is attached to a bracket 170 which extends upwardly from beam 54 to the level of the control rod. As shown in FIG. 7, the dimension of spring 52 is such that it is slightly stretched when pedestal 22 is at a fully rotated operating position, and acts upon finger 166 to hold control rod 50 in a first rotational position with respect to pedestal 22.

When the pedestal is rotated by 180° at the end of a traverse, as described above, spring 52 acts upon finger 166 to rotate control rod 50 in a clockwise direction with respect to the pedestal, terminating in the position shown in FIG. 9. In order to ensure a complete 180° rotation of the pedestal and prevent the sprinkler propulsion apparatus from stalling, spring 52 is tensioned so that control rod 50 does not rotate on the pedestal until just before the pedestal has reached the end of its 180° rotation. Various snap action devices may be incorporated on control rod 50 and its associated support structure to prevent an earlier rotation of the rod, and to ensure that the rod rotates fully at the required time.

Figures 11, 12, 13:
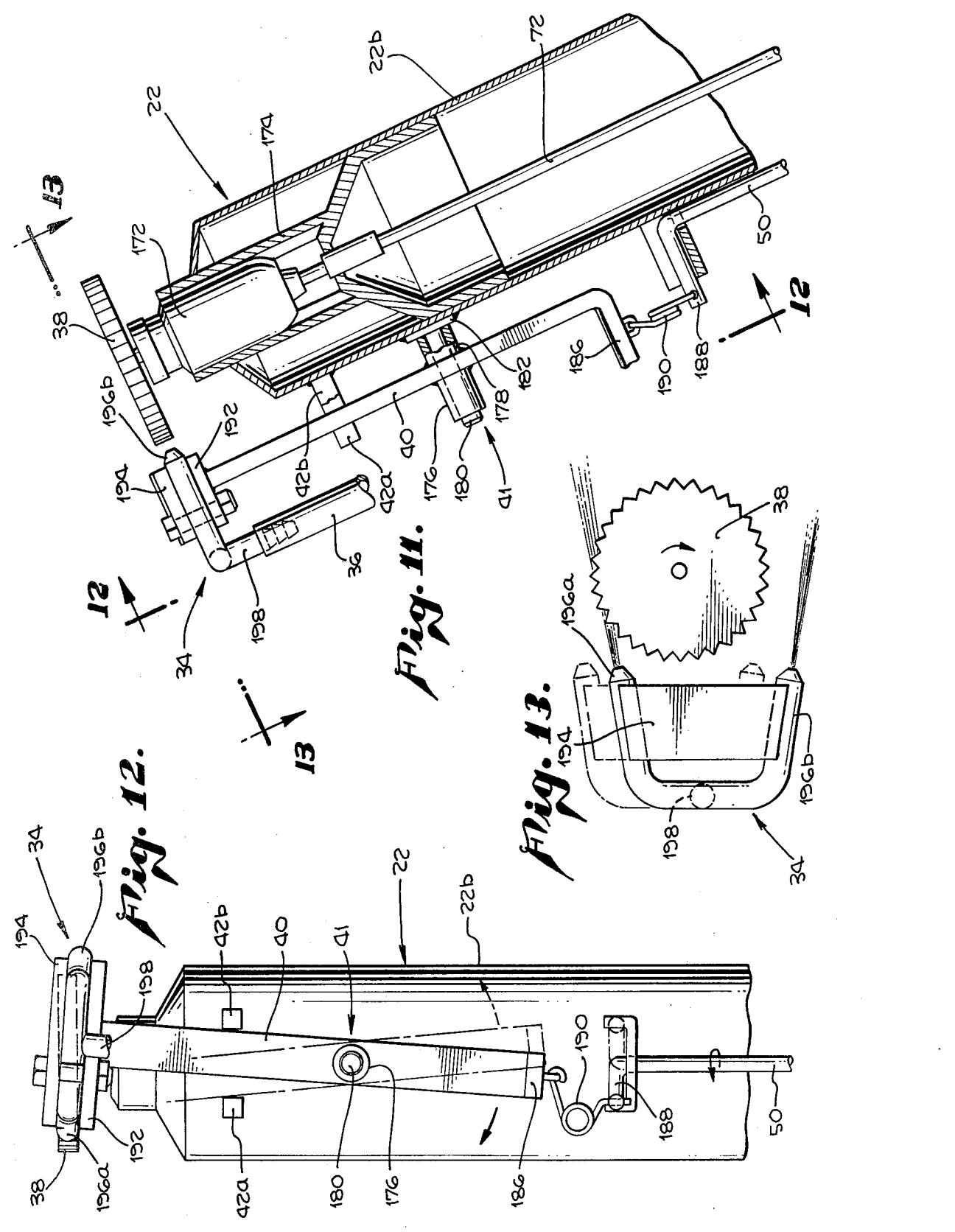

Details of the water powered drive mechanism for drive pulley 46 are provided in FIGS. 11-13. Pelton wheel 38 provides an actuating power input, driving the input gear to a three-stage planetary gear system housed in a transmission casing 172, which produces an output rotational drive on upper drive shaft 72. The gear system effects a 200:1 speed reduction between Pelton wheel 38 and the upper drive shaft. A support structure 174 for the transmission housing and upper drive shaft 72 is provided internally within pedestal 22, and rotates with the pedestal.

It will be recalled that Pelton wheel 38 is driven by a water jet from jet mechanism 34. The jet support rod 40 is rotatably mounted to pedestal 22 between a pair of nuts 176 and 178 on a pivot pin 180, which pin extends outwardly from a base plate 182 welded to the exterior of upper pedestal portion 22b. Support rod 40 is rotatable about pin 180 between spaced stops 42a and 42b welded to pedestal 22b above pin 180. The support rod terminates at its lower end with an outwardly extending finger 186, which is coupled to a similar finger 188 at the upper end of control rod 50 by a torsion spring 190. Axial rotation of the control rod 50 is transmitted through spring 190 and received as a rotational movement by jet support rod 40, as indicated in FIG. 12.

The water jet assembly 34 is carried at the upper end of support rod 40 and bolted in place between a lower plate 192, welded to the upper end of the support rod 40, and an upper plate 194. Jet assembly 34 comprises a pair of spaced outlet orifices 196a and 196b having a common inlet pipe 198 which is supplied with water from conduit 36. The jet assembly is disposed such that Pelton wheel 38 is rotated by a jet of water emitted by one or the other of orifices 196a and 196b. As best shown in FIG. 13, the rotational direction of Pelton wheel 38 is determined by which one of the two water jets is incident upon the wheel. This in turn determines the rotational direction of drive pulley 46, and accordingly the direction in which the sprinkler is propelled across the field. In FIG. 13 the water emitted from left hand orifice 196a is shown striking Pelton wheel 38, causing it to rotate in a clockwise direction as seen from above. This corresponds to the orientation of control rod 50 as shown in FIG. 9. At the end of a traverse, control rod 50 is rotated with respect to pedestal 22 as described above, and assumes the position shown in phantom lines in FIG. 13. In this position the water jet emitted from right hand jet orifice 196b strikes Pelton wheel 38 and causes it to rotate in a counter-clockwise direction, thereby reversing the direction of sprinkler travel. The positions of support rod 40 corresponding to clockwise and counter-clockwise Pelton wheel rotation are indicated in FIG. 12 in solid and phantom lines, respectively.

Referring now to FIG. 14, water accumulator housing or tank 18 comprises in general an outer tank portion 200, an inner casing 202 defining an interior reservoir, a perforated cylinder 204 positioned to receive a water supply through a port 206 in a cap 208 bolted over tank 200, a resiliently flexible, rubber-like bladder 210 retained between cylinder 204 and casing 202 and normally resting against the outer surface of cylinder 204, and a diaphragm section generally indicated at 212 which is used to actuate an intermittent, long distance spray.

The various sprinkler sections will now be described in further detail. Casing 202 divides tank 200 into two sections: an outer air plenum 214 between the external wall of casing 202 and the inner wall of tank 200, and a water reservoir 216 internal to the bladder. Annular fittings 218a and 218b are attached respectively at the upper and lower portions of the tank between casing 202 and bladder 210 to further define the limits of the water reservoir. Annular gaskets 220a and 220b are provided in corresponding grooves in bladder 210 to seal the joints between the bladder and fittings 218a and 218b. An annular channel 222 is formed in the inner wall of tank cap 208 to accomodate the upper end of perforated cylinder 204, with an O-ring seal 224 disposed in an annular groove which opens to channel 222.

Details of the nozzle assembly are shown in FIG. 15. A shaped member 226 defining an outlet orifice is held in a central opening in cap 208, between a downward facing shelf 228 on the cap and an interior threaded ring 230 which engages matching threads on the outer surface of outlet member 226 just above cap 208. The lower end of outlet member 226 is flared outwardly to form a seat 232 for a valve which controls the discharge of irrigating water through outlet member 226. A piston 234 is retained in outlet member 226 at the upper end of a connector rod 236 from diaphragm section 212. A plug 238 is threaded into the lower end of piston 234, and includes a central opening adapted to receive a ball 240 at the upper end of connector rod 236 and retain said ball against piston 234. A rubber-like valve washer 242 extending radially outwardly from piston 234 is retained at the lower end of the piston, between a downward facing shelf 243 on the piston faces of piston 234 and plug 238. Valve washer 242 is aligned with flared valve seat 232 to form a seal and block the escape of any water from tank 200 outwardly through outlet number 226 when connector rod 236 is in the raised position shown in FIG. 15. The upper portion of piston 234 comprises a plurality of vanes 246 adapted to form water discharged through outlet 226 into a suitable long-distance irrigating stream.

Referring back to FIG. 14, diaphragm section 212 includes a downward facing metallic bowl 248 which is secured to the lower end of cylinder 204 and extends outwardly towards the lower end of casing 202, a stiffly flexible, resilient bowed diaphragm 250 spanning the lower end of casing 202 and retained at its outer edge between bowl 248, casing 202, and tank 200, and connector means 252 securing a central portion of diaphragm 250 to the lower end of connector rod 236. Connector means 252 comprises a pair of bowed plates 254a and 254b which are centrally secured to opposite faces of diaphragm 250 such that the portion of the diaphragm between the plates is held flat, and a pair of sealing gaskets 256a and 256b lodged between the diaphragm and each of the bowed plates, respectively. Each of the above mentioned members of the diaphragm section is provided with an axial opening of sufficient dimension to accomodate connector rod 236, which extends through the axial openings and is retained against the lower face of plate 254b by a knob 258 at its lower end. The portion of bowl 248 interior to cylinder 204 has a plurality of perforations which enable diaphragm 250 to be flexed downwardly by the pressure of the water in reservoir 216. The lower end of tank 200 is shaped with an outward bulge forming a second plenum 262 to increase the distance through which diaphragm 250 may flex. The second plenum below the diaphragm is connected to first plenum 214 through a conduit 264, thereby enabling the escape of air from directly below the diaphragm as the diaphragm is flexed downwardly.

The operation of the accumulator tank will now be described with reference to FIGS. 14 and 16. In FIG. 14 it may be assumed that a water stream has just been discharged from the tank, and it is ready to begin another sprinkling cycle. Some residual water is left in reservoir 216, but its volume will be insufficient to appreciably expand bladder 210 away from contact with the outer wall of cylinder 204, which forms a substrate limiting inward contraction of the bladder. Also, diaphragm 250 is shown in its normal upward position adjacent bowl 248. In this position piston 234 is forced upward into outlet 226, pressing valve washer 242 against valve seat 232 and thereby preventing any water from leaving the tank through the outlet.

As water accumulates in the tank, bladder 210 is gradually expanded laterally outward away from cylinder 204, until eventually it comes into contact with casing 202. As water continues to accumulate, casing 202 limits further expansion of the bladder, and the water pressure therein builds up until it exceeds the air pressure below diaphragm 250 by an amount sufficient to flex the diaphragm downwardly. This in turn unseats piston 234 from outlet 226, permitting water to be discharged under pressure through the outlet in an irrigating stream. The initiation of outward water flow reduces the net closing pressure against piston 234, causing diaphragm 250 to snap downward to a position, shown in FIG. 16, against tank bulge 262. The interior water pressure forces a high speed stream through the outlet, resulting in a long distance irrigation.

As the volume of water inside the tank is progressively reduced, bladder 210 flexes back towards its original position from the outward flexed position shown in FIG. 16, thereby retarding a decrease in water pressure inside of the tank and sustaining a high speed water flow through the outlet for a greater volume of water than would be achieved without the use of an inflatable means such as bladder 210. The outward water flow continues until bladder 210 has returned to its original position adjacent cylinder 204, at which time the reduced water pressure inside the tank causes diaphragm 250 to flex back upwardly to the position shown in FIG. 14, forcing piston 234 upward until the valve formed by washer 242 and seat 232 is closed. At this point a spraying cycle is completed, and another cycle commences as water is introduced into the tank through inlet port 206.

In operation, water enters the bladder reservoir under a line pressure of typically 100 p.s.i. and accumulates until the water pressure in the bladder reaches a threshold level of about 95 p.s.i. At this pressure diaphragm section 212 moves down, permitting a burst of water to be discharged through the outlet orifice. When enough water has been discharged to reduce the bladder water pressure to a second threshold level, typically about 76 p.s.i., the nozzle is again closed and water again begins to accumulate in preparation for another burst. With the drive systems described above, the sprinkler is preferably propelled at a speed of about one foot per minute, and delivers about 1,600 gallons per acre on each run.

A typical spray pattern achieved with the sprinkler system described thus far is illustrated in FIG. 18. The intermittent stream 266 emitted from nozzle 24, due to its relatively greater volumetric flow rate and expulsion pressure from the sprinkler, is dispersed over a broad area 268. An intermediate and much smaller area 270 is covered by the continual stream 272 from jet means 34 which does not impact Pelton wheel 28. The area 274 closest to the sprinkler is irrigated by stream 276 from the other jet produced by jet means 34 which drives the Pelton wheel. While the continual irrigating streams 272 and 276 provide some relatively close-in irrigation that would not otherwise be achieved, it should be understood that the primary irrigation results from the long distance intermittent spray.

Referring now to FIG. 19, another embodiment of the invention is shown in which a traveling intermittent sprinkler is employed in conjunction with a center pivot irrigation system. In the exemplary embodiment this system may be of the type described in U.S. Patent Application Ser. No. 746,856, filed Dec. 2, 1976, entitled "Speed Control Means for Center Pivot Irrigation System", now U.S. Pat. No. 4,135,539 the contents of which are hereby incorporated herein by reference. This system includes a center pivot, indicated generally at 278, comprising a housing 280 mounted on a stationary base seated upon the field to be irrigated. Water is supplied via supply conduit 282, and is passed through housing 280 to a pivotally mounted, rotating elbow conduit fitting 284 connected to the first conduit section 286 of a first span unit indicated generally at 283. The irrigation system comprises a plurality of individual span units, which are interconnected in a continuous linear array extending outwardly from the center pivot for several hundreds of feet to an end span unit. For simplicity only the first span unit 283 and an end span unit 288[1] are illustrated in FIG. 19. These span units are interconnected by a collar joint 290.

Each span unit carries a plurality of interconnected water conduits 286, 286[1] by means of a wheeled carriage 292, 292[1] and associated trusses 294, 294[1], in a known manner. Each carriage includes a pair of drive wheels, each wheel being provided with a motor means operated by hydraulic fluid such that the individual span units are individually self-propelled by their associated hydraulic motor means. As described in the referenced patent application, the individual span units are controlled to remain in a generally linear alignment as the system rotates about its center pivot 278. Irrigation is achieved by a plurality of sprinkler heads 296, 296[1] provided on the upper part of conduits 286, 286[1], which continually spray the portion of the field in their immediate vicinity as the system rotates.

At the outer end of end span unit 288[1] and mounted on conduit 286[1] is an outwardly directed, intermittent sprinkler 298 such as the sprinkler shown in FIGS. 14–17. Details of its mounting and interconnection with the center pivot system are shown in FIG. 20. This sprinkler has an outer tank 300 mounted at the top of a support pedestal 302, which in turn is rotatably supported at the end of conduit 286[1]. An inner shaft 304 extends downwardly from pedestal 302, and is provided at its lower end with a beveled gear 306. A matching bevel gear 308 engages gear 306 and is supported by an apertured post 310 which extends upwardly from carriage 292[1]. Gear 308 is connected by a shaft 312 through post 310 to a crank which comprises a first pivot arm 314 connected at one end to the shaft, and at its other end to a second pivot arm 316. Arm 316 in turn is pivotally connected to an offset pin 318 on one of the drive wheels 320 for the end span unit, as seen in FIG. 21. Rotation of wheel 320 as the irrigation system circles the field causes pivot arm 316 to reciprocate generally up and down, which in turn pivots arm 314 back and forth. This pivoting movement is transmitted to the sprinkler through bevel gears 306 and 308, causing the sprinkler to oscillate through approximately a 30° arc as the irrigation system moves.

Water is supplied to sprinkler 298 from conduit 286[1] by means of a pump 322, which is mounted on the conduit and receives a water input therefrom through a hose 324 which extends into the conduit through a fitting 326. Another hose 328 connects the sprinkler to the pump output orifice. An electrical supply for the pump is provided over wires housed in a duct 330 which is mounted to the side of conduit 286[1] and extends back to the center pivot area. Pump 322 increases the pressure of the water supply to sprinkler 298 from a pressure within conduit 286[1] of approximately 80 p.s.i., to an operating pressure level of approximately 120 p.s.i., at which it intermittently produces a long distance irrigating spray as described above.

The system shown in FIG. 19 may be advantageously employed to appreciably increase the area irrigated by a center pivot system with a less than proportional increase in capital cost. Without the intermittent sprinkler, a center pivot system produces a circular irrigation pattern, indicated by circle 332 in FIG. 25. When a larger area is to be irrigated a plurality of center pivot systems are used, each irrigated circular field being approximately tangential to the adjacent fields. This results in a relatively large area outside of each circle which is not covered by any of the irrigation apparatus and is essentially unused. This is the area outside circle 332 but inside a square 334 drawn around the circle. With the addition of long distance intermittent sprinkler 298, this area can be effectively covered and added to the total productive land. The employment of an intermittent device enables a larger area to be covered without oversaturating the ground with water. In the preferred embodiment the intermittent sprinkler is operated only for a portion of the total sprinkling cycle, when it is adjacent the otherwise unused part of the field. As indicated in the figure, this occurs over arcs 336 of approximately 45° at the corners of square 334. The sprinkler is turned off over the 45° arcs 338 between corners, since in this range the center pivot system most nearly covers the whole area of the square.

Electrical control apparatus for operating the intermittent sprinkler as indicated in FIG. 25 is shown in FIGS. 22–24. Referring first to FIG. 22, a switch housing 340 is mounted to the vertical portion of elbow pivot fitting 284 by a bracket 342. Switch housing 340 rotates with the center pivot over a track on the upper surface 344 of pivot housing 280 which comprises four spaced ramps 346, each extending circumferentially for an arc of approximately 45°, and mutually separated by similar 45° arcs. Ramps 346 are positioned in radial alignment with the corner arcs 336 of the field for which irrigation is desired. Referring now to FIGS. 23 and 24, a pair of electrical supply lines 348 for the intermittent sprinkler water pump are terminated at switch housing 340. A microswitch is provided inside housing 340 for connecting these wires to a source of electrical supply (not shown). The switch is operated by a plunger 350 which extends below housing 340 and carries a wheel 352 at its lower end. Wheel 352 rides on the upper pivot housing surface along the track formed by ramps 346. In FIG. 23 the switch is shown in a lowered or off position, with wheel 352 between ramps. In FIG. 24 the irrigation system has pivoted so that wheel 352 is now riding on top of one of the ramps 346, raising plunger 350 to turn the microswitch on and supply power to the water pump, thereby enabling operation of intermittent sprinkler 298. As the system continues to rotate the microswitch is cyclically turned on when sprinkler 298 is within one of the field side arcs 338. The amount of land under irrigation is thereby considerably increased with only a relatively small increment in capital investment.

Referring now to FIGS. 26 and 27, another embodiment of a traveling intermittent sprinkler is shown in which the support and driving structure for the sprinkler shown in FIGS. 2-13 is adapted for a larger capacity sprinkler which carries a correspondingly heavier water load. The general features of the support structure shown in FIG. 26 are the same as in the embodiment described above. A rotatable support pedestal 354 is provided with an outer pulley 356 for reversing the direction of sprinkling at the end of a traverse. An upper drive shaft 358 is connected via universal joint 360 to a lower drive shaft 362, which in turn operates a gear reduction system housed in transmission housing 364 to rotate a drive pulley 366. Apparatus for oscillating the support column is also provided, of which a pivot arm 368 is shown attached to the other side of pulley 366. A base plate 370 is attached in cantilever fashion to a circular beam 372 supported on the sprinkler sled; if desired another beam may be provided on the other side of the base plate for additional support.

The strengthened structure of the sprinkler support apparatus is shown in greater detail in FIG. 27. In place of cylindrical tubular member 94 shown in the embodiment of FIG. 4, a conically tapered member 374 is provided with an outwardly directed flare 376 at its lower end which rests upon and is bolted directly to plate 370. Support pedestal 354 is carried on member 354, and a low friction annular bearing 380 seated in a shelf 382 provided at the upper end of structural member 374. Fitting 378 and bearing 380 are mutually engaged along an annular sloped interface, whereby structural member 374 provides vertical support for pedestal 354 while preventing any appreciable horizontal movement of the column. A bearing seal 384 for the lower drive shaft 362 sits over the upper open end of structural member 374. At its lower end pedestal 354 terminates in an outwardly flaring lip 386, which sits under an annular ring member 388 attached to the upper surface of flare 376 by the same bolts 390 which hold the flare to the base plate.

Transmission casing 364 is located below the base plate 370 and secured thereto by bolts 390 engaged in threaded bolt holes in the casing. A rotary drive movement is imparted to drive pulley 366 from lower drive shaft 362 by a double planetary gear arrangement generally similar to the one described in conjunction with FIG. 4, but employing larger and stronger gears. The principal features of a traveling, intermittent sprinkler are thus retained in this embodiment, while greater strength is provided to support a greater water volume for longer distance or higher saturation spraying.

From the foregoing description of various exemplary embodiments of the present invention in improved traveling and intermittently spraying agricultural sprinklers, it should be readily apparent to those skilled in the art that the aforestated objects of the present invention have been achieved. While the invention has been described in detail, with particular reference to certain exemplary embodiments thereof, it is to be understood that numerous modifications thereof may be made by one skilled in the art and still come within the scope and spirit of the invention, which is only limited by the terms of the following claims.

I claim:

1. In a traveling sprinkler system having a directional sprinkler means, a base for said sprinkler means, means for propelling said base in at least two directions over a field, and means for supplying irrigation water to said sprinkler means, the improvement comprising a tubular support pedestal rotatably mounted to said base and carrying said sprinkler means, and means for rotating said pedestal only in connection with a change in the direction of travel of said base to alter the sprinkler direction.

2. The traveling sprinkler system of claim 1, wherein said means for rotating said pedestal is provided so as to rotate said pedestal 180° each time the direction of travel of said base changes.

3. In a traveling sprinkler system adapted for use of a field having stop means positioned on opposite sides of an area to be irrigated and having a directional sprinkler means, a base for said sprinkler means, means for propelling said base over a field, and means for supplying irrigation water to said sprinkler means, the improvement comprising a tubular support pedestal rotatably mounted to said base and carrying said sprinkler means, and means for rotating said pedestal to alter the sprinkling direction, said pedestal rotating means comprising an axially translatable shift rod means carried on said base, the opposed ends of said shift rod means carrying members adapted to engage said stop means, a wire means having its opposite ends attached at spaced locations on said shift rod, and wire receiving means on said pedestal engaging an intermediate portion of said wire to be rotated thereby when said shift rod is axially moved.

4. The traveling sprinkler system of claim 3, said wire receiving means comprising a pulley circumferentially mounted on said pedestal.

5. The traveling sprinkler system of claim 3, said propulsion means including means for engaging a guide wire extending between opposed field stops to propel the base along said guide wire, wherein said stop engaging members are adapted to rest upon and be supported by the guide wire.

6. In a traveling sprinkler system having a directional sprinkler means, a base for said sprinkler means, means for propelling said base over a field, and means for supplying irrigating water to said sprinkler means, the improvement comprising a tubular support pedestal rotatably mounted to said base and carrying said sprinkler means, means for rotating said pedestal to alter the sprinkler direction, a rotary drive means for propelling the base over a field, and pivotable linkage means coupling the rotary drive means with said pedestal to oscillate the pedestal, thereby causing the direction of sprinkling to traverse an arc as said drive means rotates.

7. The traveling sprinkler system of claim 6, said linkage means comprising a bell crank mounted on said base, a first link means connected between said bell crank and said rotary drive means, and a second link means connected between said bell crank and said pedestal.

8. In a traveling sprinkler system having a directional sprinkler means, a base for said sprinkler means, and means for supplying irrigating water to said sprinkler means, the improvement comprising a tubular support pedestal rotatably mounted to said base and carrying said sprinkler means, said support pedestal being hollow, means for rotating said pedestal to alter the sprinkling direction, and means for propelling said base over a field, said base propelling means comprising a water wheel mounted at the top of said pedestal, water jet means supplied by said water supply means for directing a water jet to rotate against said water wheel, a rotatable drive pulley carried by said base below said pedestal, said pulley being adapted to engage a guide wire extending across a field and to move said base along said guide wire as the pulley rotates, and drive shaft means extending generally axially through said pedestal and rotationally coupling said water wheel with said pulley.

9. The traveling sprinkler system of claim 8, and further comprising an upstanding housing secured to said base, said support pedestal being co-axially positioned over said housing and rotatable thereabout, and means supporting said pedestal on said housing.

* * * * *